United States Patent
Swager

[19]

[11] Patent Number: 5,882,023

[45] Date of Patent: Mar. 16, 1999

[54] WHEELED TRANSPORT DEVICE

[75] Inventor: William E. Swager, deceased, late of Fremont, Ind., by Dan Swager, legal representative

[73] Assignee: Sur-Loc™, Inc., Fremont, Ind.

[21] Appl. No.: 805,114

[22] Filed: Feb. 24, 1997

[51] Int. Cl.⁶ .................................................. B62B 1/20
[52] U.S. Cl. ................................ 280/47.131; 280/47.3; 280/47.32
[58] Field of Search ................ 280/47.3, 78, 47.32, 280/304.5, 295, 767, 63, 47.131

[56] References Cited

U.S. PATENT DOCUMENTS

| | | |
|---|---|---|
| 1,221,579 | 2/1917 | Olds . |
| 1,672,717 | 4/1928 | Gentner . |
| 2,426,244 | 8/1947 | Sitton .................................. 280/47.131 |
| 2,922,487 | 5/1960 | Reitknecht . |
| 3,279,810 | 10/1966 | Ashworth ................................ 280/47.3 |
| 3,282,375 | 11/1966 | Ray . |
| 4,009,762 | 3/1977 | Bjerkgard . |
| 4,852,895 | 8/1989 | Moffitt ...................................... 280/63 |
| 4,968,060 | 11/1990 | Rooney ................................. 280/47.32 |
| 5,064,020 | 11/1991 | Eagleson . |
| 5,086,872 | 2/1992 | Lin . |
| 5,105,908 | 4/1992 | Freund . |
| 5,181,731 | 1/1993 | Gustausen ................................ 280/63 |
| 5,195,611 | 3/1993 | Untz . |
| 5,242,030 | 9/1993 | Lobozzo . |
| 5,253,732 | 10/1993 | Daniels . |
| 5,282,520 | 2/1994 | Walker . |
| 5,295,556 | 3/1994 | Mullin . |
| 5,314,042 | 5/1994 | Adams . |
| 5,564,722 | 10/1996 | Cimo ....................................... 280/47.3 |
| 5,727,799 | 3/1998 | DiSario ..................................... 280/78 |

*Primary Examiner*—Richard M. Camby
*Attorney, Agent, or Firm*—Hill & Simpson

[57] ABSTRACT

A wheeled transport device is provided for maneuvering elongated objects in a simplified manner. To this end, an axle is connected between arms attached to crossbeams that form a bracket. Tabs extending from the crossbeams secure the object being transported to the bracket. The tabs are designed such that the brackets can be easily removed or its position altered on the object transported.

9 Claims, 4 Drawing Sheets

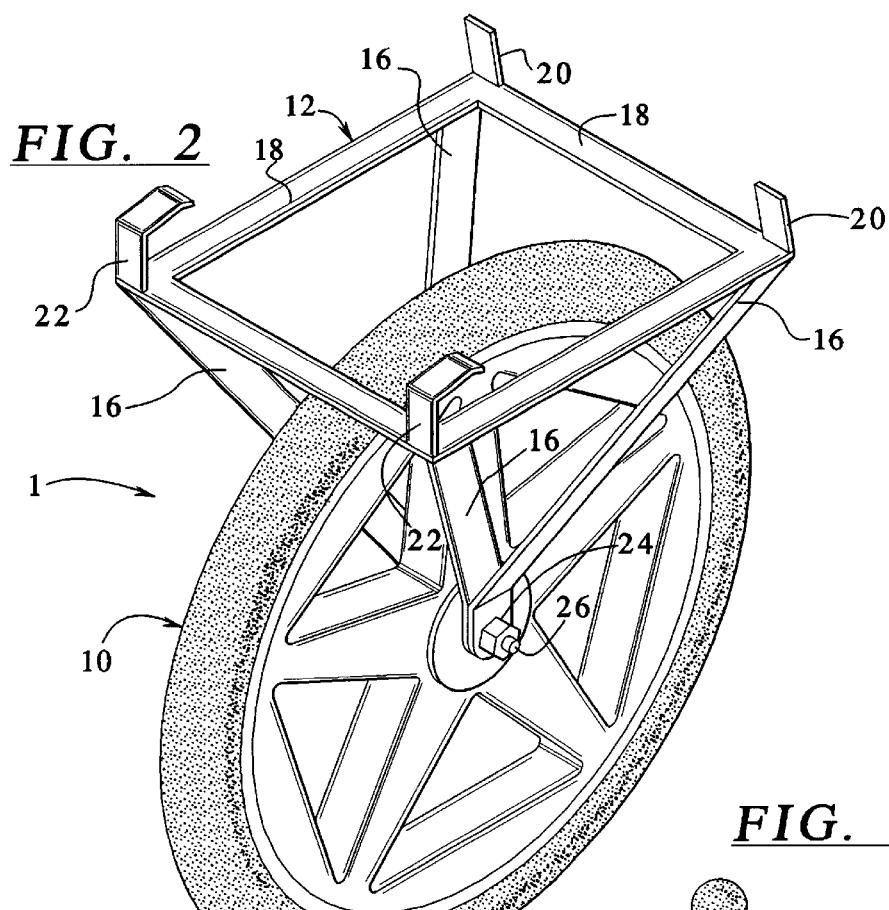
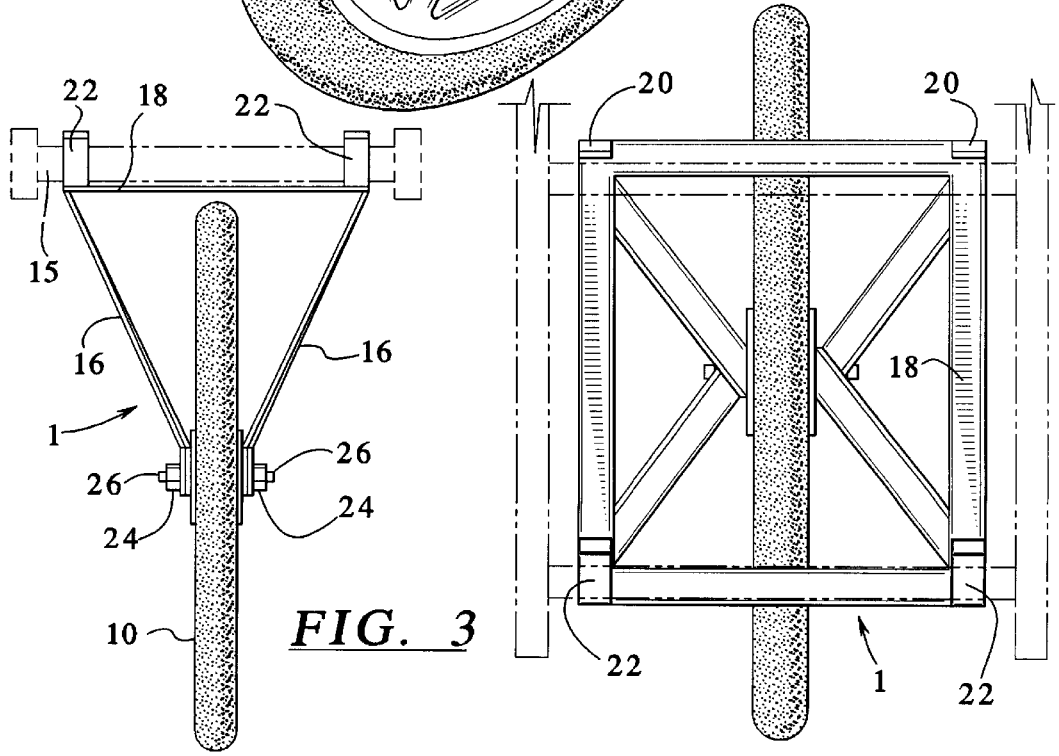

WHEELED TRANSPORT DEVICE

BACKGROUND OF THE INVENTION

The present invention generally relates to a wheel adapted to fit on an apparatus to assist in transporting the same. More specifically, the present invention relates to a removable wheel attachable to an elongated object, such as a ladder or a canoe.

It is generally known to transport an object, either manually by carrying the object, or by using an assist device, such as wheels attachable to the object to make the object less cumbersome and simpler to move.

A disadvantage of known wheeled assisting mechanisms is that the wheels are either permanently attached to the object or are not easily adjusted on the object. Therefore, the wheel is not always properly positioned in an arrangement to easily manipulate the object.

A need, therefore, exists for an improved wheeled device that overcomes the deficiencies of the known devices and simplifies placement of the device in conjunction with the object being transported.

SUMMARY OF THE INVENTION

The present invention provides a removable wheeled transport device capable of attachment to an elongated object, such as a ladder or a canoe, to simplify transport and maneuvering of the same.

To this end, in an embodiment, the present invention provides a transport device for moving an object. The device has a wheel having an axle extending through the wheel. Rigid arms extend from the wheel and are operatively attached to the axle of the wheel such that the wheel freely rotates on the axle. At least one rigid bracket is connected to the rigid arms forming a plane. Tabs extend perpendicularly from the at least one rigid bracket receiving a portion of the object to assist in transport thereof.

In an embodiment, the rigid arms and the at least one rigid bracket are integrally formed.

In an embodiment, the at least one rigid bracket and the tabs are integrally formed.

In an embodiment, at least two tabs are constructed to extend perpendicularly from the at least one rigid bracket and bend to extend substantially parallel to the at least one rigid bracket.

In an embodiment, a second wheel is remotely situated from the wheel and operatively connected to the axle of the wheel.

In an embodiment, the at least one rigid bracket extends between the rigid arms on two distinct planes parallel to each other.

In an embodiment, four rigid brackets are connected to form a rectangular, planar area.

In an embodiment, the rigid arms are divergently tapered from the axle of the wheel.

In an embodiment, at least two tabs are constructed to extend only perpendicularly from the at least one rigid bracket.

In an embodiment, an arm is constructed to extend between the rigid arms and removable from extending between the rigid arms.

It is, therefore, an advantage of the present invention to provide a transport device for moving large or cumbersome objects.

Another advantage of the present invention is to provide a transport device that may be easily removed from the object being transported.

A still further object of the present invention is to provide a transport device that can readily be changed in position with respect to the object being moved.

Yet another advantage of the present invention is to provide a transport device that is simple to use.

And, another advantage of the present invention is to provide a transport device that is inexpensive to manufacture.

Moreover, an advantage of the present invention is to provide a transport device that is easily adaptable for many different objects.

These and advantages of the present invention are described in, and will be apparent from, the detailed description of the presently preferred embodiments and from the drawings.

BRIEF DESCRIPTION OF THE DRAWINGS

FIG. 2 illustrates a perspective view of an embodiment of the wheeled transport device of the present invention.

FIG. 3 illustrates a front plan view of an embodiment of the wheeled transport device of the present invention.

FIG. 4 illustrates a top plan view of an embodiment of the wheeled transport device of the present invention.

DETAILED DESCRIPTION OF THE PRESENTLY PREFERRED EMBODIMENTS

Figure 1:
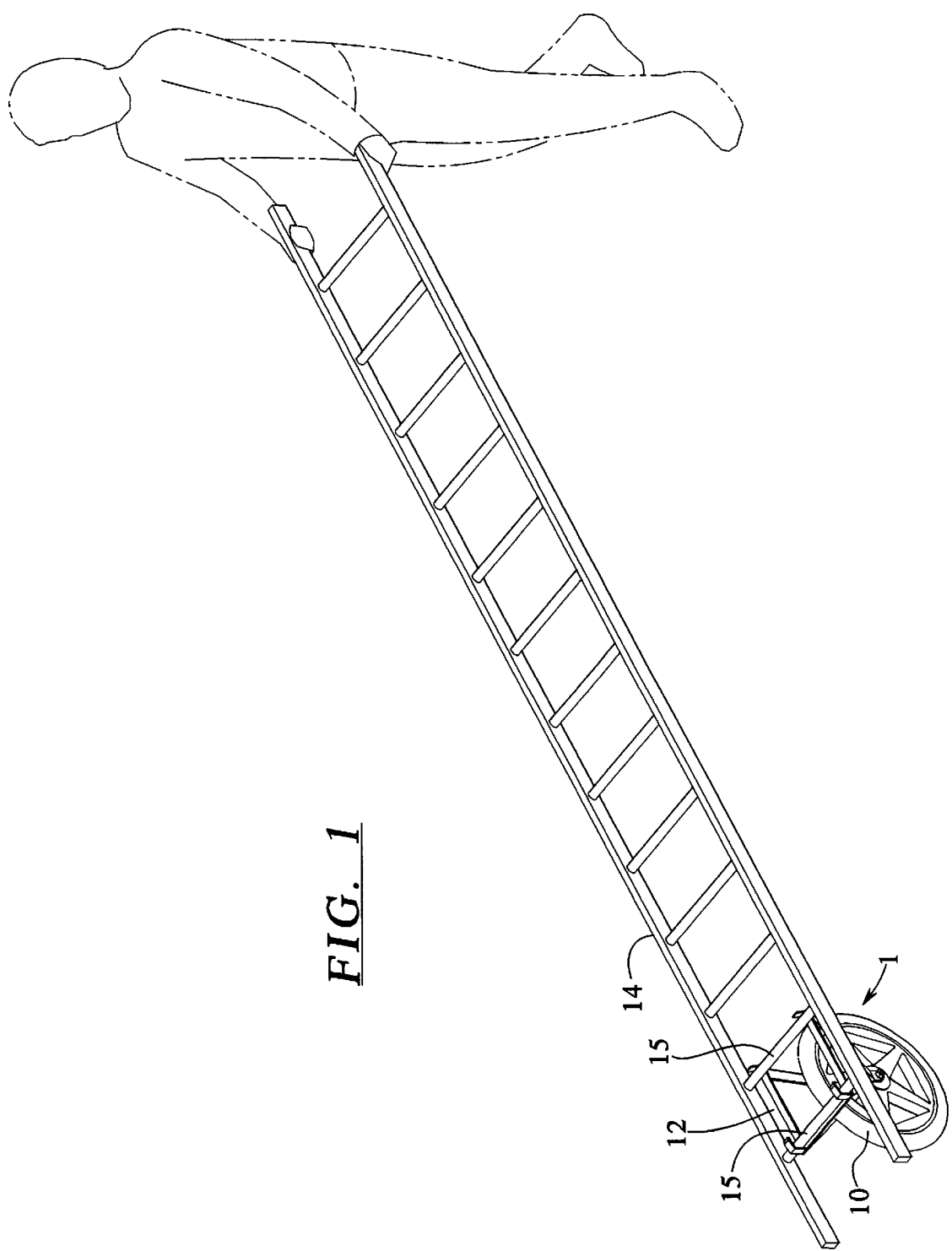
FIG. 1 illustrates a perspective view of an embodiment of a wheeled transport device of the present invention connected to a ladder.

Referring now to the drawings wherein like numerals refer to like parts, FIG. 1 illustrates a wheeled transport device 1 having a single wheel 10 connected to a bracket 12. The bracket 12 is designed such that it is connectable to an object to be transported, such as a ladder 14, as illustrated in FIG. 1. Rungs 16 of the ladder 14 are connected to the bracket 12 as shown in FIG. 1 and will be described more clearly with reference to FIGS. 2–5.

As illustrated in FIG. 2, the bracket 12 is attachable to the wheel 10 by angularly extending arms 16 that attach to crossbeams 18. The crossbeams 18 form a planar surface and are integrally formed with the arms 16. Extension tabs 20 are integrally formed with the crossbeams 18 and perpendicularly extend from the crossbeams 18 at two corners of the planar rectangle which the crossbeams 18 form. At the other two corners, hooked tabs 22 are integrally formed and extend from the crossbeams 18. The hooked tabs 22 attach to, for example, rungs of a ladder or edges of a seat which will be described hereinafter with reference to the other figures.

As further illustrated in FIG. 2, a nut 24 and bolt 26 secure the bracket 12 to the wheel 10. The bolt 26 extends through an axis of the wheel 10 and the nut 24 is secured thereto after the crossbeams 18 are placed as shown in FIGS. 2 and 3.

Referring to FIGS. 3 and 4, rungs 15 of the ladder 14 may be placed between the extension tabs 20 and the hook tabs 22 to rest on the crossbeams 18 of the bracket 12. As a result, a level surface is provided wherein the rungs 15 and hence the ladder 14 are secured to the wheeled transport device 1.

The extension tabs 20 and the hooked tabs 22 provide a simplified arrangement in which the ladder 14 may be maintained on the wheeled transport device 1. Likewise, the wheeled transport device 1, by the arrangement of the bracket 12, may be simply moved between rungs 15 of the ladder 14.

Figure 5:
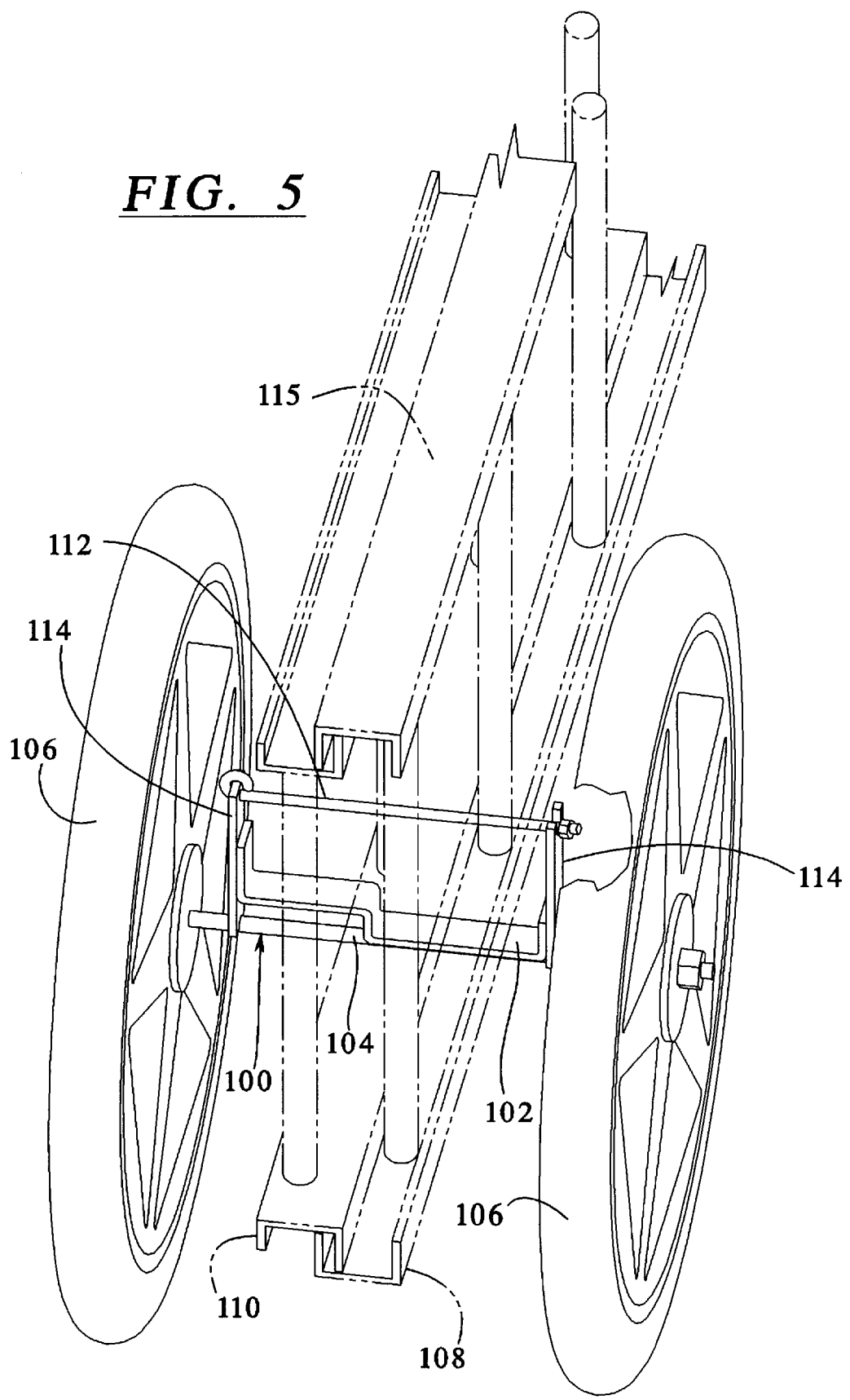
FIG. 5 illustrates a perspective view of an alternate embodiment of a wheeled transport device of the present invention.

Referring now to FIG. 5, a two-wheeled transport device 100 is illustrated. The transport device 100 illustrated in FIG. 5 is designed such that a ladder with nesting rails may be transported as shown. A bracket 102 is formed and placed in an orientation substantially parallel to an axis 104 connecting tires 106 of the transport device 100. The bracket 102 is designed such that a rail 108 and a corresponding nesting rail 110 of a ladder may rest on one side of the bracket 102. The nested rail 110 is supported on another end of the bracket 102 arranged to be substantially parallel to the axis 104 but slightly removed therefrom as illustrated in FIG. 5. An arm 112 is removable from the crossbars 114 between which the bracket 102 and the arm 112 are mounted. The crossbars 114 are, in turn, operatively connected to the axis 104 connecting the tires 106. In operation, the arm 112 is moved and the rail 108 and the nesting rail 110 are placed on the bracket 102 such that the arm 112 may be placed between adjacent rungs of the ladder 115.

Figure 6:
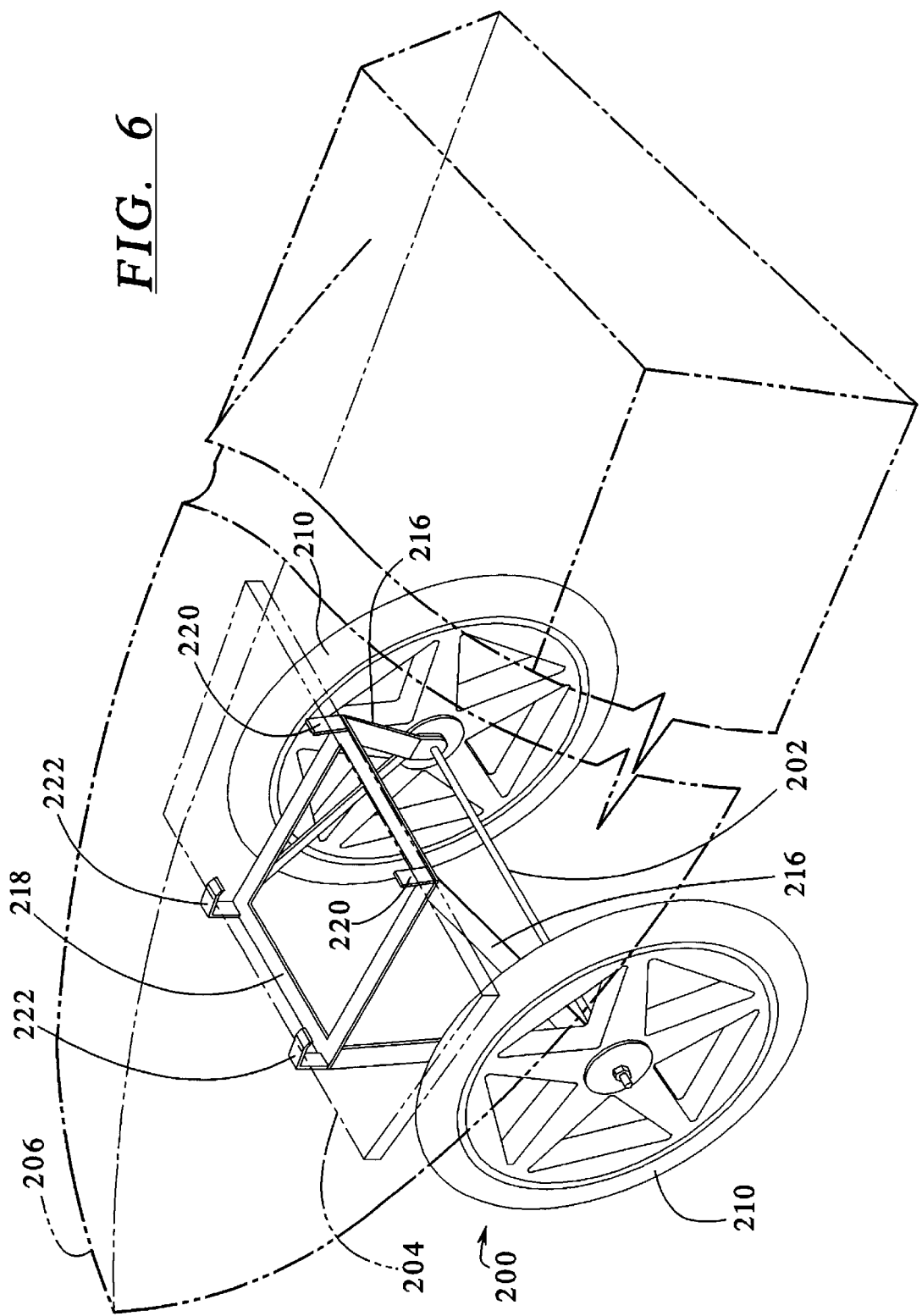
FIG. 6 illustrates a perspective view of an alternate embodiment of the wheeled transport device of the present invention as implemented with a canoe or small boat.

Another embodiment of a two-wheeled transport device 200 is illustrated in FIG. 6. The two-wheeled transport device 200 is similar to the device 1 illustrated and described with respect to FIGS. 1–4 with the exception that the arms 216 that extend from the axle to the crossbeams 218 are flared outwardly with an axle 202 connecting the wheels 210 between the arms 216. As shown, extension tabs 220 and hooked tabs 222 are provided to attached to, for example, a seat 204 of, for example, a canoe or small boat 206. The two-wheeled transport device 200 provides a simplified arrangement for maneuvering an object, such as the boat 206, and providing stability during the maneuvering. Of course, the wheeled transport device 1 may be similarly implemented with the boat, but the two-wheeled device 200 may provide better stability and support.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

It is claimed:

1. A transport device for moving an object, the device comprising:
    a wheel having an axle extending through the wheel;
    rigid arms extending from the wheel and operatively attached to the axle of the wheel such that the wheel freely rotates on the axle;
    at least one rigid bracket connected to the rigid arms forming a plane;
    tabs extending perpendicularly from the at least one rigid bracket receiving a portion of the object to assist in transport thereof wherein at least two tabs are constructed to extend perpendicularly from the at least one rigid bracket and bend to extend substantially parallel to the at least one rigid bracket.

2. The device of claim 1 wherein the rigid arms and the at least one rigid bracket are integrally formed.

3. The device of claim 1 wherein the at least one rigid bracket and the tabs are integrally formed.

4. The device of claim 1 further comprising:
    an arm constructed to extend between the rigid arms and removable from extending between the rigid arms.

5. The transport device of claim 1 further comprising:
    a second wheel remotely situated from the wheel and operatively connected to the axle of the wheel.

6. The transport device of claim 1 wherein the at least one rigid bracket extends between the rigid arms on two distinct planes parallel to each other.

7. The transport device of claim 1 wherein four rigid brackets are connected to form a rectangular, planar area.

8. The transport device of claim 1 wherein the rigid arms are divergently tapered from the axle of the wheel.

9. The device of claim 1 wherein at least two tabs are constructed to extend only perpendicularly from the at least one rigid bracket.

* * * * *